(No Model.) 3 Sheets—Sheet 1.

J. WOOD.
WHEEL.

No. 432,848. Patented July 22, 1890.

Witnesses

Inventor.
John D. Wood (No Model.) 3 Sheets—Sheet 2.

J. WOOD.
WHEEL.

No. 432,848. Patented July 22, 1890.

Witnesses.
Geo. M. Fenwick
Andrew Bain

Inventor:
John Wood (No Model.) 3 Sheets—Sheet 3.

J. WOOD.
WHEEL.

No. 432,848. Patented July 22, 1890.

Witnesses:
Wm Hayer
Oscar B Newman

Inventor:
John Wood

UNITED STATES PATENT OFFICE.

JOHN WOOD, OF PHILADELPHIA, PENNSYLVANIA.

WHEEL.

SPECIFICATION forming part of Letters Patent No. 432,848, dated July 22, 1890.

Application filed June 7, 1890. Serial No. 354,642. (No model.)

*To all whom it may concern:*

Be it known that I, JOHN WOOD, a citizen of the United States, residing at Philadelphia, in the State of Pennsylvania, have invented a new and useful Improvement in Metallic Frame Joints or Couplings, which will be more fully hereinafter set forth.

The object of this invention is to provide a transverse joint or coupling which is particularly designed to be used in wheels, show stands or racks, awning-frames, fences, bridges, ladders, tree-boxes, saw-frames, clamps, turn-buckles, and other like structures.

My improved joint is more particularly adapted to serve as a spoke for wheels of all kinds, and in consequence of its lightness and strength is especially fitted for use on bicycles and similar devices; and it consists in details of construction which will be more particularly herein set forth in the specification, and summed up in the claims following.

Referring to the drawings hereto annexed, Figure 1 represents a wheel, showing my improved joint used as a spoke. Fig. 2 is a transverse section of the same on line $x\ x$ of Fig. 1. Fig. 3 is a view of one of the spokes detached. Figs. 4 and 5 are modifications of the joint when used as a spoke. Fig. 6 represents the joint when used in connection with tubular structures; and Fig. 7 is a view similar to that of Fig. 6, with some of the details omitted. Fig. 8 represents another modification of my improvement.

The details of the device consist of a rod B, having an end screw-threaded, as shown at $c$, and the opposite end provided with an eye E. Passing through this eye is a smaller rod C, which is bent back upon itself, so as to form two spring-arms. These arms have their ends bent at right angles and extending along the surface of the interior of the transverse section, as shown at $d$ and $d'$. The ends are farther bent at right angles and extend through openings in the transverse section. They are screw-threaded and provided with nuts D, which hold them firmly together to their work.

The modification shown in Fig. 6 simply has two arms bent at right angles and bearing upon the lower inner portion of the engaging-surface, as shown at $d'$. This is designed for light work, such as will not require a great strain thereupon.

In Fig. 1 is shown the application of joint to a wheel. The screw-threaded end is secured to the hub in the manner shown or by any preferred method. The rods B are provided with eyes that are angular in cross-section, as indicated at $c'\ c''\ c'''\ c''''$, Fig. 2. The rods C are shaped to conform to the angularity of the eyes, which may be lozenge-shaped, square, triangular, or any shape that will present a series of shoulders which will bind the two parts and prevent looseness and consequent vibration.

The rods C may be flared more or less, according to the requirements of the service to which they are applied. When used in a wheel, it is thought to be desirable to have a greater degree of divergence than when used in tubular or analogous structures, such as are shown in Figs. 6 and 7. The rods C are shown as having their terminals forming hooks. These pass through slots in the part with which it is to engage and the screw-threaded ends pass again backwardly through taps—as in a tire, for instance—and upon these nuts are placed.

The operation or mode of inserting the rod and its spring-arms is very simple. One end of the spring C is passed through the eye E until the bend is reached. The two parts are compressed and passed along the upright A until the transverse section is reached, when by their resilience they open and their threaded ends pass through the openings in this section. The nuts D are then applied and then turned home. This having been done, the cap $a$ is applied to the screw-threaded end of the rod B, and the nut $b$ is applied to this or the base to which the upright is secured and turned until the spring-arms C are drawn upon sufficiently to bring the two sections together and unite them firmly.

In the modification the ends of the arms simply rest along the interior of the tube and hold it firmly. By this arrangement there are no protruding ends of rods or nuts to interfere with the symmetry of the frame-work, as is the case where plain straight rods must of necessity pass through both sections, while at the same time a great degree of strength is attained and at the point most desired—that is, at the junction of the end of the spoke and the contacting surface of the transverse section.

The modification shown in Fig. 8 represents the rod B as connected to the felly or tire of a wheel, while the spring-arms are attached to the hub, all the details being the same as in the other views, the position of the parts only being reversed.

I do not limit myself to the exact construction shown, as various modifications and changes may be made, which will not depart from the spirit of my invention.

Figure 1:
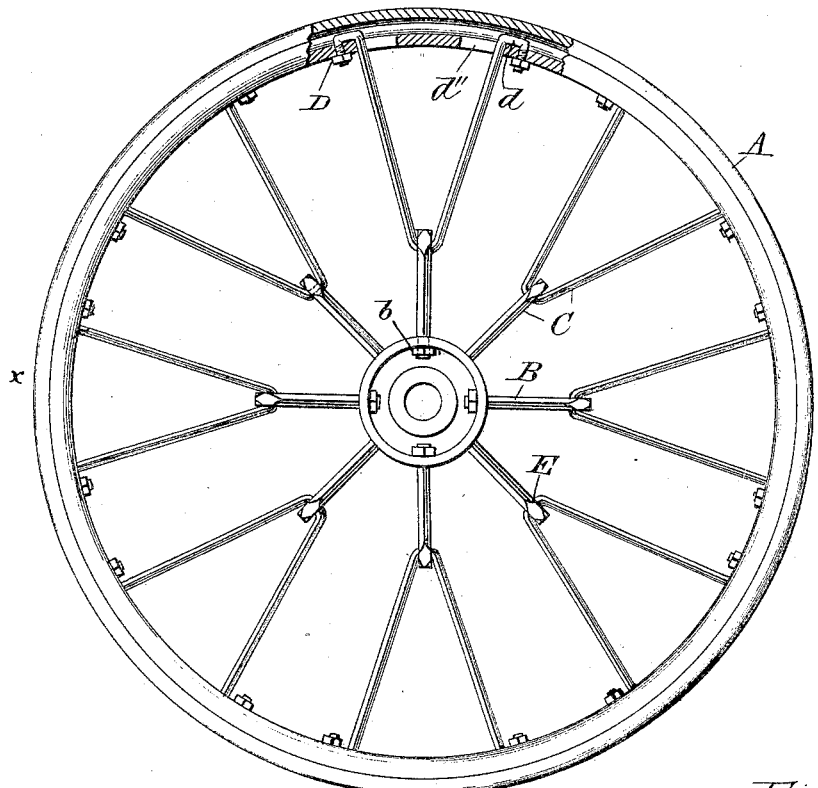
Figure 2:
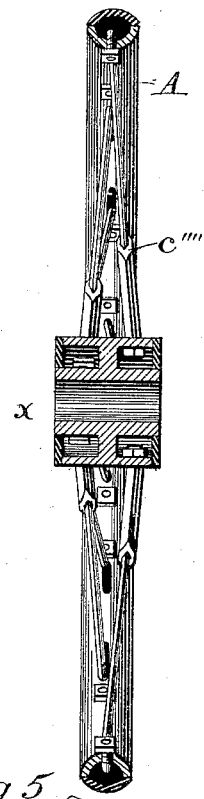
Figure 3:
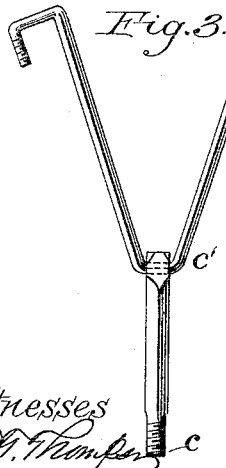
Fig. 3 shows the form of spoke illustrated in Figs. 1 and 2—that is, lozenge-shaped in cross-section, as is the rod C also.
Figure 4:
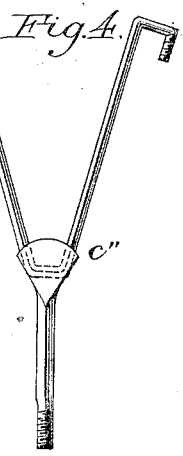
Figs. 4 and 5 represent the rod B, provided with grooved heads into which the rods C rest to form an additional security against any vibratory movement.
Figure 5:
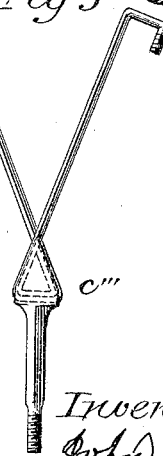
Figure 6:
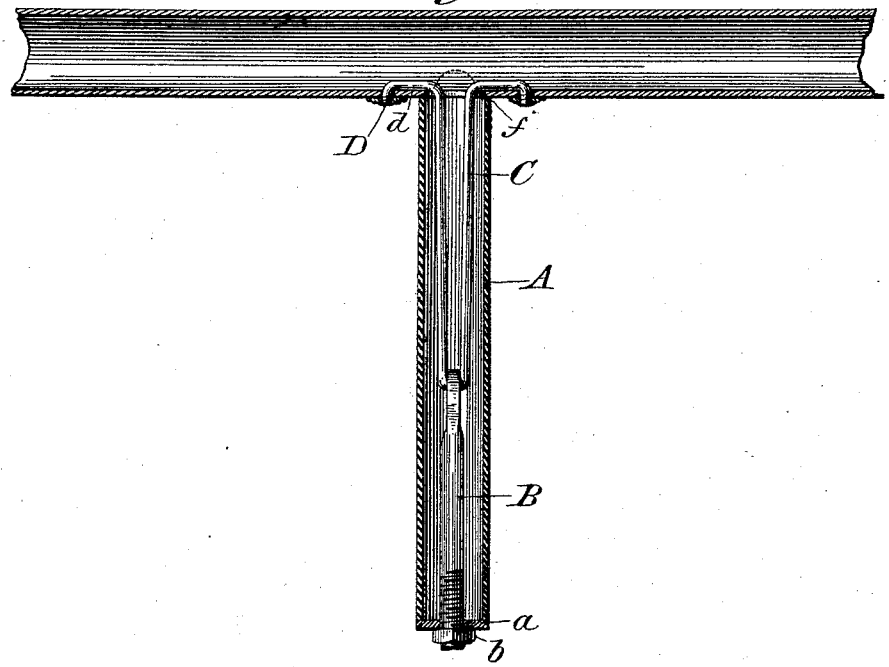
Figure 7:
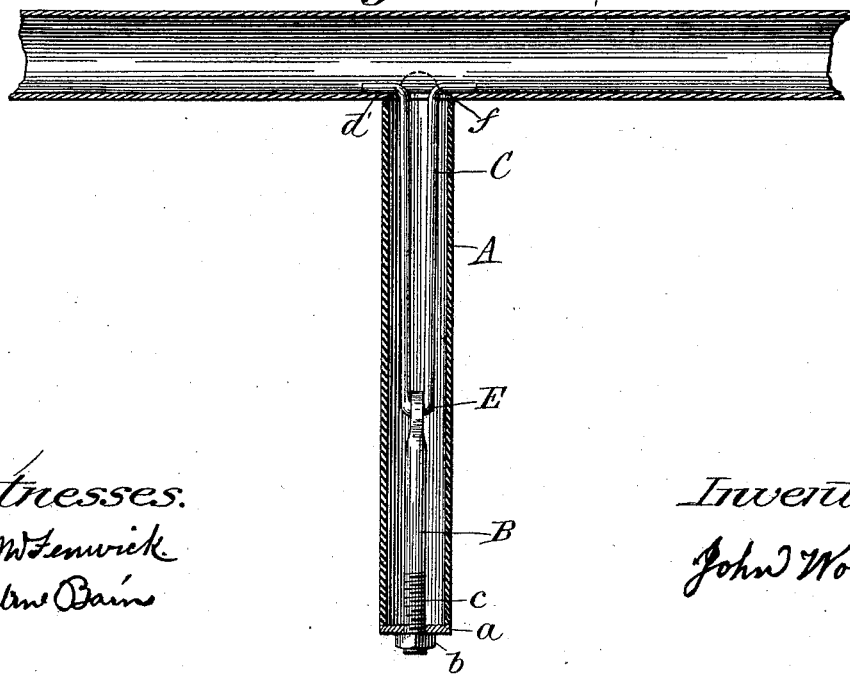
Figure 8:
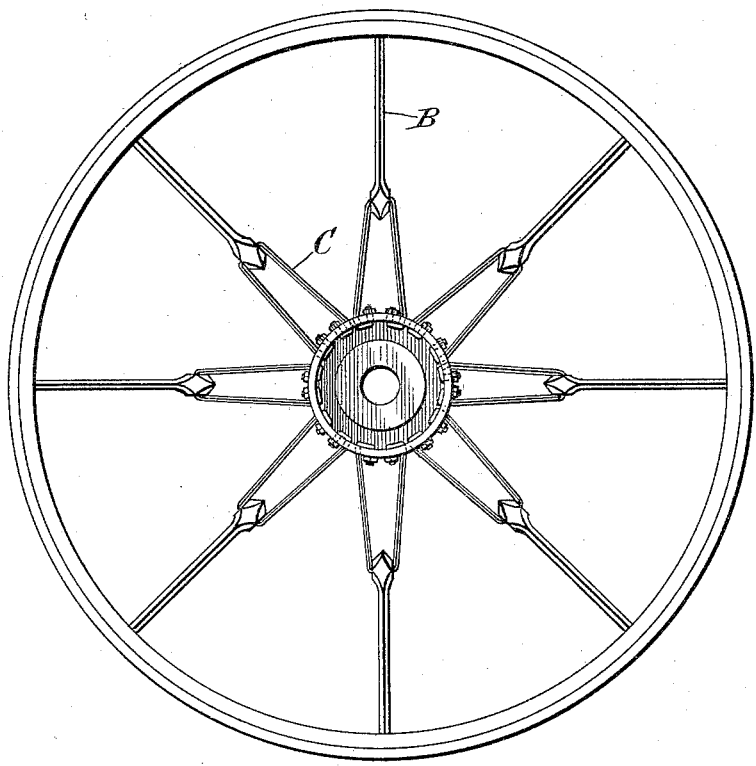

Having thus described my invention, what I claim as new, and desire to secure by Letters Patent, is—

1. A rod having an eye at one end, spring-arms passed therethrough and constituting an extension of the rod, and having their ends bent at right angles to engage with a surface placed at right angles to the rod, and arms, the opposite end of said rod being provided with a screw-thread for the engagement of a washer or cap, and a nut.

2. A rod having an eye at one end, a screw-thread at the other, spring-arms passing through said eye and constituting an extension of the rod approximately, their ends bent at right angles to the arms and again bent at right angles and screw-threaded for the engagement of nuts.

3. In combination with a tube having a similar tubular section arranged upon its end and transversely thereto, of a rod located within said tube, spring-arms diverging from said rod and having their terminals bent at right angles to engage the interior surface of the transverse section, and means for securing said tube and rod to a suitable base.

JOHN WOOD.

Witnesses:
O. T. THOMPSON,
JNO. J. STOFFORD.